Nov. 27, 1956 R. W. DEARDORFF 2,772,350

ACTIVE FREQUENCY-SELECTIVE FILTER NETWORK
USING DOUBLE FREQUENCY CONVERSION

Filed Dec. 1, 1954 4 Sheets-Sheet 1

INVENTOR.
RALPH W. DEARDORFF
BY
Buckhorn and Cheatham
ATTORNEYS

Nov. 27, 1956 R. W. DEARDORFF 2,772,350

ACTIVE FREQUENCY-SELECTIVE FILTER NETWORK USING DOUBLE FREQUENCY CONVERSION

Filed Dec. 1, 1954 4 Sheets-Sheet 2

INVENTOR.
RALPH W. DEARDORFF
BY
Buckhorn and Cheatham
ATTORNEYS

INVENTOR.
RALPH W. DEARDORFF
BY
Buckhorn and Cheatham
ATTORNEYS

INVENTOR.
RALPH W. DEARDORFF
BY
Buckhorn and Cheatham
ATTORNEYS

United States Patent Office 2,772,350

Patented Nov. 27, 1956

2,772,350

ACTIVE FREQUENCY-SELECTIVE FILTER NETWORK USING DOUBLE FREQUENCY CONVERSION

Ralph W. Deardorff, Portland, Oreg.

Application December 1, 1954, Serial No. 472,334

4 Claims. (Cl. 250—20)

This invention relates to improvements in signal receiving equipment and particularly to radio-frequency signal receivers and methods of receiving radio-frequency signals.

It is well known in the receiver art that the lower the I. F. frequency, the better the selectivity that can be obtained. However, lowering the I. F. frequency means that the frequency of the local oscillator more closely approaches the frequency of the incoming carrier and side bands. As a consequence of this, image frequencies of the incoming carrier and side bands are more readily passed by the tuned circuit or circuits ahead of the first converters or detectors, and thus the advantage of greater selectivity is offset by the disadvantage of the stronger image signals in the receiver.

A main object of the present invention is to provide a receiver including circuit components cooperable with the conventional local oscillator and associated converter to so suppress image frequencies as to permit a closer spacing of the local oscillator frequency and an incoming carrier and its side bands than exists in conventional receivers, without an accompanying increase in the signal strength of the image frequencies.

Another object of the present invention is to provide a radio-frequency signal receiver where the image frequencies may be suppressed or entirely cancelled without the use of frequency selective networks, or may be suppressed in a superior manner than heretofore possible by means cooperating with the conventional frequency selective networks.

A further object of the present invention is to provide a method of suppressing or cancelling image frequencies, including the steps of providing two sets of image voltages and converting and phase shifting such voltages until they are of cancellable phase.

A still further object of the present invention is to provide radio-frequency equipment operable to receive an incoming signal and to convert the signal down to audio or video, while eliminating images without the use of selective networks.

Still another object of the present invention is to provide radio-frequency equipment which permits a desired band of frequencies in the frequency spectrum to be selected or isolated and brought down to an audio or video, or other desired level, without the use of selective networks, to obtain improved performance, or with the use of selective networks to obtain markedly improved selectivity.

The radio-frequency equipment of the present invention, when assuming the form of a receiver, is characterized by including the conventional local oscillator and the associated converter, and in addition, circuit components including a second converter, a phase shifter arranged between the local oscillator and one of the converters, and a phase shifter and balancing circuit arranged to receive the outputs of the two converters. This receiver is operable to perform a first relative phase shifting operation on converted voltages and then a second phase shifting operation in a manner to place the image frequencies in cancellable phase in the balancing circuit, but to place a carrier and its side bands in non-cancellable phase in the balancing means so that these may be furnished as an input to an I. F. stage of the receiver.

Various other objects of the present invention will be apparent from the following description taken in connection with the accompanying drawings, wherein.

Figure 1:
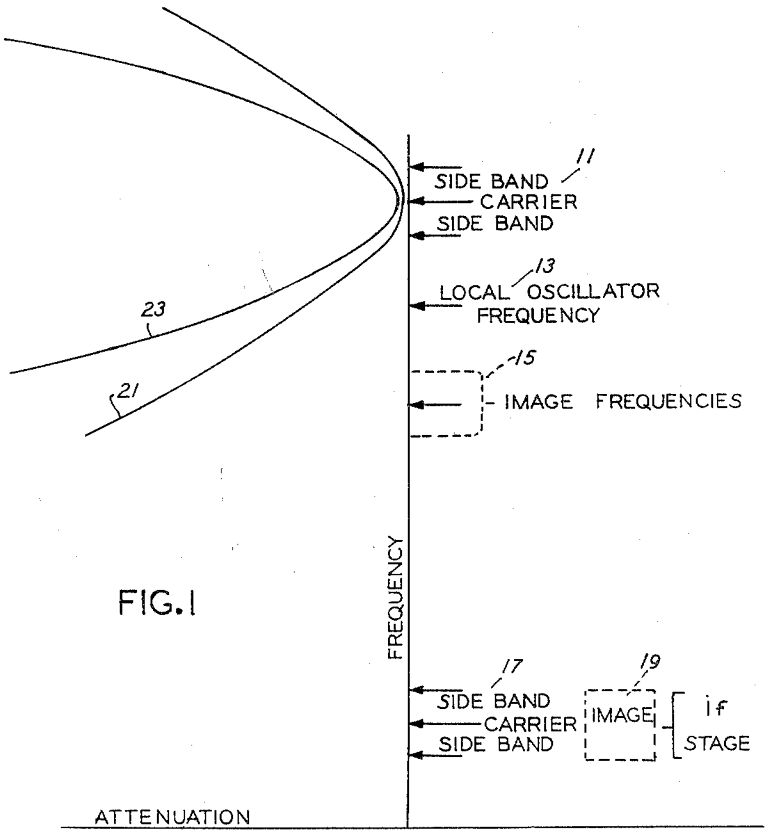
Fig. 1 is a diagram showing in a receiver essential relationships which are helpful in an understanding of the present invention.

Referring to the accompanying drawings wherein similar reference characters designate similar parts throughout, the diagram in Fig. 1 indicates on a vertically extending frequency spectrum line an incoming carrier and its two side bands at 11, the local oscillator frequency at 13 and an image frequency or frequencies at 15. By image frequencies, it is meant frequencies which would interfere with the proper reception of desired signals. While the reference numeral 11 indicates the side bands and carrier at the antenna of the receiver, the reference numeral 17 indicates the side band and carrier in the intermediate frequency range, produced by modulating the incoming carrier and side bands 11 with the local oscillator frequency 13.

The block at 19 indicates the position in the spectrum that the image frequencies might occupy in the I. F. stage. Since the upper part of Fig. 1 shows that the image frequencies are spaced below the local oscillator frequency the same distance that the side bands and carrier are spaced above the local oscillator frequency, it is apparent that in the intermediate frequency range the carrier and its side bands would occupy the same position that the image frequencies might occupy.

The reference numeral 21 in Fig. 1 indicates the selectivity curve of one tuned circuit and the reference numeral 23 indicates the selectivity curve of a more complicated and thus more highly selective tuned circuit or network. For convenience, the selectivity curves have been associated with the vertical frequency spectrum line and thus have signifiance of relationship to the carrier and side band frequencies, the local oscillator frequency, and the image frequency. The frequency selective curves may be considered as being plotted with the frequency spectrum line being an ordinate instead of an abscissa, as in customary practice, and with filter attenuation being an abscissa instead of an ordinate, as it is shown conventionally. Also, the selectivity curves may be considered as being plotted in terms of loss, increasing from right to left.

Figure 2:
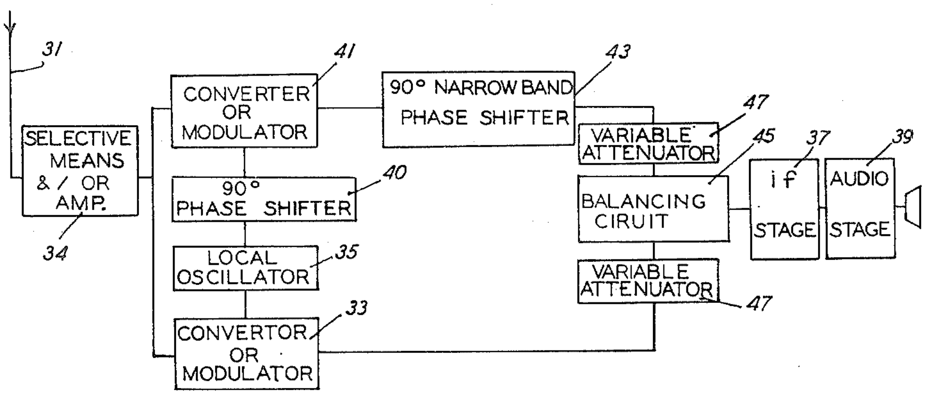
Fig. 2 is a block diagram of a receiver embodying the concepts of the present invention.

The present invention provides a receiver shown in block diagram in Fig. 2 in which image frequencies are eliminated or greatly reduced in intensity prior to final demodulation, and in the particular diagram shown the image frequencies are eliminated or suppressed prior to the I. F. stage of the receiver. The receiver is adapted to be supplied with incoming signals through the antenna 31, the receiver including a conventional modulator or converter at 33 and a conventional local oscillator at 35. Frequency selective means and/or an amplifier at 34 may or may not be provided, as will be more fully explained hereinafter. The receiver also includes an I. F. stage at 37 and an audio stage at 39, both of which are of conventional construction. The I. F. stage 37 provides selectivity and final demodulation and thus may be considered as including selectivity means and final demodulation means. Added to the foregoing conventional parts of the receiver is a 90° phase shift network 40 interposed between local oscillator 35 and a second converter 41, which is connected in parallel with converter 33 to receive signals from antenna 31, through selective circuits and/or amplifiers 34, if such are provided. The second converter 41 feeds its output to a 90° narrow band phase shift network at 43, the output from such phase shift network and the first converter 33 being combined in a balancing circuit 45 of conventional construction. A variable attenuator 47 is provided between each converter and the balancing circuit.

In general, the operation of the receiver in Fig. 2 is as follows: the image frequencies are so phase shifted by the second modulator 41 and phase shifter 43, that the image frequencies in the I. F. range produced in the upper branch of the receiver circuit cancel out the image frequencies in the I. F. range produced in the lower branch of the first part of the receiver. However, because the incoming carrier and side bands are located on the opposite side of the local oscillator frequency from that of the image frequencies, in the frequency spectrum, the two sets of frequencies are differently affected in a manner such that in the balancing circuit the converted carrier and side band voltages in upper and lower I. F. branches add with one another. Thus, the I. F. stage receives the incoming carrier and its side bands, converted to the intermediate frequency range, without image frequencies, or with severely suppressed image frequencies.

Figure 3:
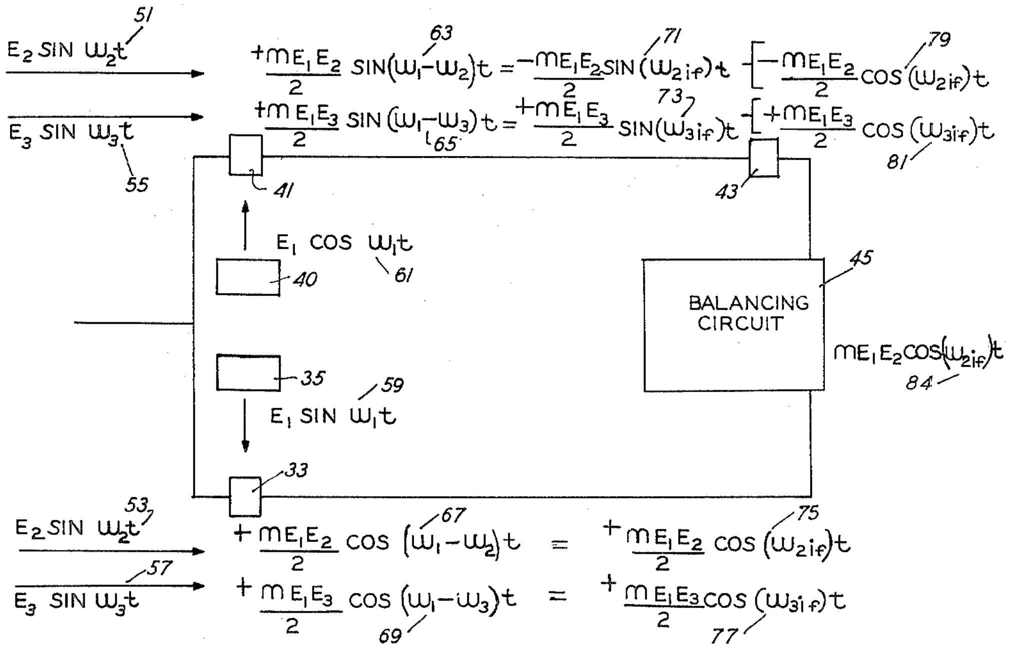
Fig. 3 is a diagram illustrating the manner of operation of the receiver disclosed in Fig. 2.

The operation of the receiver circuit disclosed in Fig. 2 is best understood by reference to the diagram in Fig. 3, where important voltages are represented in trignometric terms. For purposes of explanation, the frequency of the local oscillator may be considered as $$\frac{w_1}{2\pi}$$

a frequency in the upper or lower side band may be considered as $$\frac{w_2}{2\pi}$$

and its image frequency below the lower oscillator frequency in the spectrum may be considered as $$\frac{w_3}{2\pi}$$

The incoming side band frequency voltage may, therefore, be expressed in terms of a single signal as $$e_2 = E_2 \sin w_2 t$$

This voltage, because of the parallel circuitry employed, is fed to both the upper and lower converters, as indicated at 51 and 53 in Fig. 3.

Figure 4:
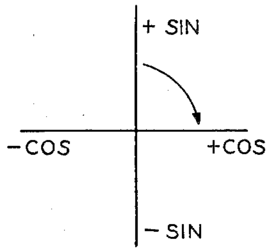
Fig. 4 is a diagram which is helpful in understanding the phase shifting operation of a phase shifting network of the receiver of the present invention.

The incoming image frequency voltage is $e_3 = E_3 \sin w_3 t$. This voltage is likewise fed to both the upper and lower converters, as indicated at 55 and 57 in Fig. 3. The voltage produced by the local oscillator is $e_1 = E_1 \sin w_1 t$, this voltage being fed to the lower converter 33, as indicated at 59 in Fig. 3. This voltage, when fed to the phase shifter 40 interposed between the local oscillator and converter 41, is phase shifted 90° and thus becomes $E_1 \cos w_1 t$, it being assumed that phase shifter 40 is of the type which shifts the phase in the direction of the arrow in Fig. 4. This voltage is supplied to converter 41, as indicated at 61. Since the converters at 33 and

41 are essentially product modulators, the I. F. or converted frequency produced by each converter may be calculated in the following manner, the illustration being taken for the desired band signal in the upper branch of the circuit:

$$e_2 \text{ (I. F.)} = E_1 \cos w_1 t E_2 \sin w_2 t m = + \frac{mE_1E_2}{2} \sin (w_1 - w_2)t + \frac{mE_1E_2}{2} \sin (w_1 + w_2)t$$

In the above equations $m$ equals the constant of modulation. It is evident that only the first term on the right-hand portion of the second equation represents the converted output of the converter 41 in the I. F. range, the second term of the right-hand part of the equation representing a frequency of almost double the frequency of the original side band. Thus, the second term of the right-hand part of the second equation shown will be suppressed by the I. F. selectivity and can be ignored. In Fig. 3, the I. F. voltage representing the side band signal in the I. F. range is indicated at 63. It is apparent from the above equations that the output of converter 41 for the image frequency in the I. F. range will be represented by the equation 65.

Now, turning to the operation of the lower converter 33, the following equations show the converted side band signal produced in the lower branch of the receiver:

$$e_2 \text{(I. F.)} = E_1 \sin w_1 t E_2 \sin w_2 t m = \frac{mE_1E_2}{2} \cos (w_1 - w_2)t - \frac{mE_1E_2}{2} \cos (w_1 + w_2)t$$

Again, it is only the first term of the right-hand part of the lower equation shown above which is in the I. F. range, and thus this has been indicated in Fig. 3 as a product of the converter 33 by the reference numeral 67. It can be similarly shown that the image frequency product in the I. F. range produced by converter 33 is the voltage represented by the equation at 69 in Fig. 3.

Now, considering both the upper and lower branch I. F. voltages, it is apparent that with reference to voltage 63 in Fig. 3, $w_2$ is larger than $w_1$, and because $$\sin (-a) = -\sin (a)$$

the side band signal at 63 assumes the form of equation 71, as shown in Fig. 3, with a minus sign. However, with regard to the image frequency voltage at 65, $w_1$ is greater than $w_3$, and thus this voltage retains its positive sign, as shown at 73, where $w_{\text{I. F.}}$ is intended to represent the subtraction of $w_2$ and $w_3$ from $w_1$ in equations 71 and 73.

Now, referring to the equations for the I. F. voltages 67 and 69, both equations will retain the positive sign because the $\cos(-a) = \cos a$. Thus, the voltage equation 67 assumes the form shown at 75 and the voltage equation 69 assumes the form shown at 77.

When the voltages represented by equations 71 and 73 pass through the 90° phase shifter 43, the voltages will assume the form of the equations at 79 and 81, respectively, such equations being identical to equations 71 and 73 except with the change of sin to cos. It it again assumed that the direction of phase shifting is in the direction of the arrow in Fig. 4. When the voltages represented by equations 79 and 81, 75 and 77 are combined in the subtracting balancing circuit 45, it is evident that since the image voltages represented by equations 77 and 81 are identical and of the same sign, they will entirely cancel one another, if adjusted to equal amplitudes by the variable attenuators, whereas the wanted signal voltages represented by equations 75 and 79 are identical and of opposite sign and, therefore, are additive. The two side bands and the carrier in the I. F. range will, therefore, be fed to the I. F. stage 37 of the receiver, as indicated at 84 in Fig. 3, free, or substantially free, from images.

Theoretically, the two I. F. image voltages in the two branches of the circuit will be of the same magnitude, but from a practical standpoint it is evident that, due to differences in circuit components employed, the magnitudes of such voltages will vary relative to one another. The variable attenuator 47 may be adjusted to bring the I. F. image voltages to substantially the same magnitude so that they are severely suppressed, or even in some cases entirely cancelled.

It is important to note that, with reference to the circuit disclosed in Figs. 1 through 4, it is not necessary that the local oscillator frequency be less than that of an incoming carrier and its side bands. The local oscillator frequency in Fig. 1 could be located above the incoming carrier and side bands shown. In such case, an appropriate additive balancing circuit could be employed to cancel out or suppress the image frequencies in the I. F. range instead of the wanted signal frequencies. It is also pointed out that the phase shifter network 43 could be placed in the lower branch instead of the upper branch to obtain cancellation or suppression of image frequencies. It is further pointed out that, whereas the direction of phase shift in Fig. 4 has been indicated as being in a clockwise direction, the phase shift may be in a counterclockwise direction, providing other components are suitably correlated. The direction of shift depends upon whether the phase shifting network is of the advancing or retarding type.

It is apparent from the above discussion that the phase shifter 43 may be located in the upper or lower branch, that the phase shifter 40 or 43 may be of either the retarding or the advancing network type, and that the balancing circuit 45 may be of the additive or subtractive type, it being remembered that these various components must be correlated so that the image voltages in the I. F. range will cancel out or be suppressed in the balancing circuit. It is also pointed out that the phase shifter network 43 in Fig. 2 is a narrow band phase shifter since the ratio of the band width passed by phase shifter 43 is small compared to the lowest frequency passing through the phase shifter. Thus, phase shifter 43 may be of simple construction in contrast to a wide band phase shifter such as would be necessary to pass the audio frequency range.

It is further pointed out that it is conceivable that the circuit disclosed in Figs. 1 through 4 could be arranged so that the difference between the local oscillator frequency and an incoming carrier and its side bands is greater than the frequency of the incoming carrier and side bands so that, instead of the intermediate frequency being lower than the carrier and its side bands, the intermediate frequency could be above such carrier and side bands in the frequency spectrum. Although the phase shifter at 43 has been shown as a phase shifter network, other types of phase shifting devices may be substituted therefor, and the same is true of phase shifter 40.

With circuits embodying the concepts of the present invention it is possible to entirely eliminate any tuned circuit or circuits ahead of the first detectors or converters since the image frequencies will be cancelled out or suppressed in the circuit of the present invention. However, the circuit of the present invention can be used to advantage in connection with selective means, such as a tuned circuit or circuits, to suppress the image frequencies to a value heretofore not possible. This is best explained with reference to Fig. 1 wherein it is evident that, if no tuned circuits or other selective means were employed, the image frequencies would be received by the first detectors as strongly as would be the incoming carriers and side bands. Although such image frequencies may be suppressed in the circuit disclosed, particularly with an adjustment of the variable attenuators to make the upper and lower branch I. F. image voltages have substantially equal magnitude, variations in the operating characteristics of the circuit components over a period of time may change the relative magnitudes of such voltages.

To avoid having to adjust the variable attenuators periodically, a selective means, such as 34, may be placed ahead of the converters or detectors 33 and 41 so that the image frequencies are not received with the same strength as are the carrier and its side bands. When these weaker image signals reach the balancing circuit, they are suppressed and thus assume a lower value than would be the case without the tuned circuits. Therefore, with the circuit of the present invention, the tuned circuits ahead of the first detectors or converters may be eliminated in some instances, or may be retained to obtain a superior performance than heretofore possible.

Because of the severe suppression of the image frequencies, with a receiver of the present invention it is possible to space the local oscillator frequency closer to an incoming carrier and its side bands to thus drop the intermediate frequency of the receivers and therefore permit superior selectivity. As previously indicated, the lower the I. F. frequency, the better selectivity that can be obtained.

With a superior image suppression circuit, it is also possible to space the incoming channels closer to one another in the frequency spectrum because when the various channels are converted down to the lower I. F. range, where greater selectivity is obtained, more closely adjacent channels will be satisfactorily rejected by the more higher selective circuits in the I. F. stage.

When the circuit of the present invention is embodied in a television receiver, the receiving circuit can be substantially simplified. As is well known, tuning from one television channel to another is usually accomplished by gang switches which select preset tuned radio-frequency and local oscillator circuits. With a circuit embodying the concepts of the present invention, a substantial number of the components necessary for tuning a television receiver from one channel to the other can be eliminated without sacrifice of performance, or the circuit of the present invention can be used in conjunction with the existing tuning components to obtain superior performance.

Figure 5:
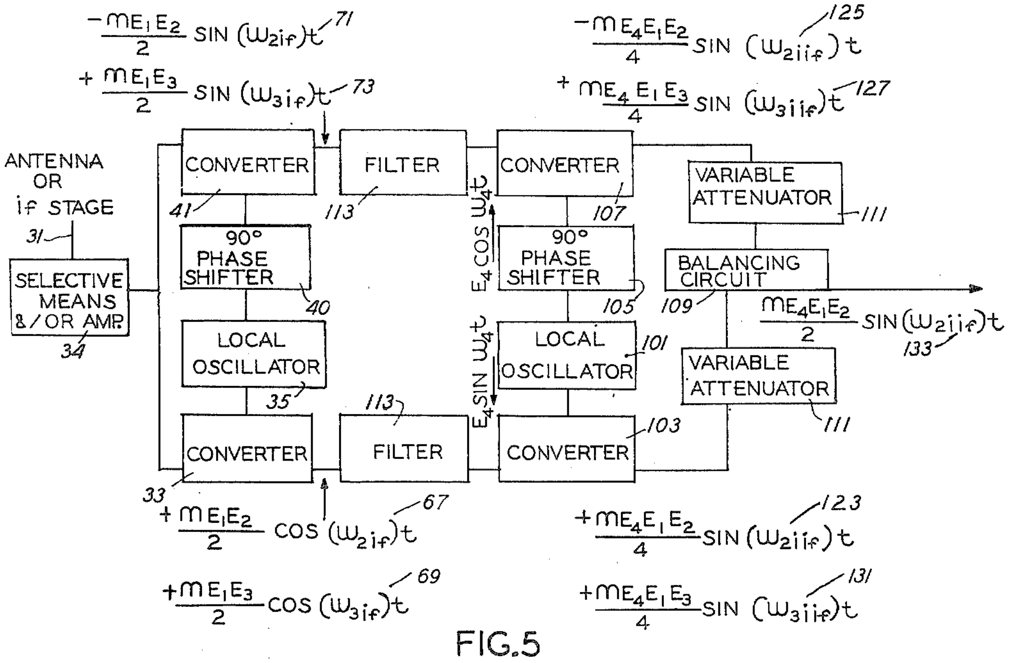
Fig. 5 is a block diagram of a modified circuit.
Figure 6:
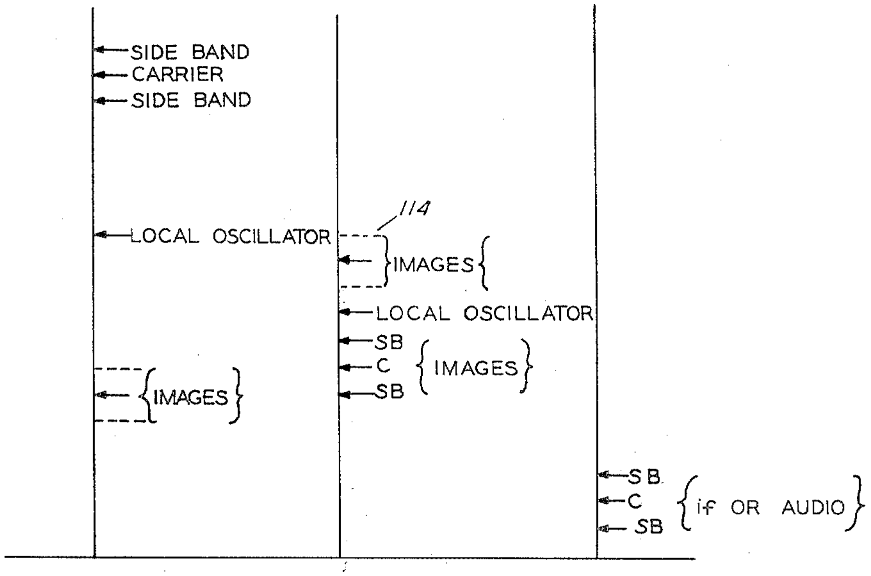
Fig. 6 is a diagram of a frequency spectrum which is helpful in understanding the operation of the circuit disclosed in Fig. 5.

Referring to Figs. 5 and 6 where a modified form of the invention is shown, the circuit disclosed is generally similar to the circuit disclosed in Fig. 2. The modified circuit includes two branches and an antenna 31 which feeds signals to two converters 33 and 41, the converters being connected to a local oscillator 35. A 90° phase shifter network at 40 is interposed between the oscillator 35 and connector 41. The I. F. voltages produced by the converters are shown at 67, 69, 71 and 73, and are identical to the similarly numbered converter output voltages in Fig. 3.

In the circuit disclosed in Fig. 5, the converted band signal and image voltages are fed to a phase shifting means and a balancing circuit. Whereas the phase shifting means in the Fig. 2 circuit assumes the form of a 90° phase shifter network or equivalent shifting device, the phase shifting means in the Fig. 5 circuit includes a second local oscillator 101 connected to a converter 103, the local oscillator also being connected to a 90° phase shifter 105 which is connected to a converter 107. The outputs of converters 103 and 107 are connected to a balancing circuit at 109. Variable attenuators 111 are preferably employed to enable the magnitudes of the image voltages in the two branches of the circuit to be brought to the same value. Suitable filters at 113 are connected between the upper and lower converters, as the parts are depicted in Fig. 5, for a purpose to presently appear.

Referring to Fig. 6, the frequency spectrum lines are similar to that shown in Fig. 1, the lines being arranged across the sheet with reference to Fig. 5 so that the frequencies marked on said line correspond to the frequencies existing in portions of the circuit they underlie in Fig. 5. An incoming carrier and its side bands are indicated at 11. The converted side bands and carrier in the I. F. range are shown at 17, and a further converted carrier and side bands are shown at 117. It is pointed out that in Fig. 6 the frequency of the local oscillator 101 is shown located in the frequency spectrum above the frequencies of the side bands and carrier in the intermediate frequency range.

It could as well be located below such carrier and side bands, providing other components were suitably correlated in their operation.

The operation of the Fig. 5 circuit is similar to that of the Fig. 1 circuit down to the filters 113, as previously indicated. The filters or tuned circuits at 113 are provided for the purpose of eliminating signals which would be images of the carrier and side bands in the intermediate frequency range. Such image signals are shown at 114 in Fig. 6. The filters or tuned circuits 113 do not, however, and could not, eliminate the converted image voltages at 69 and 73 because they are of the same frequency as the converted band signal voltages 67 and 71. The output of the local oscillator 101 to the converter 103 is shown at 121, and the output from the phase shifter 105 to the converter 107 is shown at 123.

By equations similar to those previously employed, it can be shown that the converted band signal output from converter 107 is that indicated at 125 in Fig. 5, the equation retaining its minus sign because of the fact that the local oscillator frequency is above the side band frequency and thus $w_4 - w_{I.F.}$ is a positive quantity. It can be similarly shown that the converted image voltage represented by the equation 73 prior to conversion will be that represented by the equation 127, this equation likewise retaining its positive sign because of the fact that the local oscillator frequency is disposed above the converted image voltage in the frequency spectrum as is apparent from Fig. 6.

Similarly, it can be shown that the output of converter 103 is a converted band signal voltage represented by the equation 129 and a converted image voltage represented at 131. When voltages 125, 127, 129 and 131 are received by the subtracting balancing circuit 109, the output of the circuit will be the converted band signal voltages as indicated at 133.

It is possible to use the circuit disclosed in Fig. 5 as an image cancelling device to supply wanted signals to an I. F. stage in the manner that the portion of the circuit in Fig. 2 ahead of the I. F. stage is used, since the converters 103 and 107, and the local oscillator 101 and phase shifter 105 constitute a phase shifting means which operate on the converted voltages to cause the elimination or suppression of the images of the incoming signal and side band in the balancing circuit. However, the circuit may be employed with considerable advantage to receive the output from an I. F. stage of a receiver and to provide an audio output without the use or necessity of an audio phase shifter. It is also possible with the circuit disclosed in Fig. 5 for the input 31 to be an antenna and the output from the balancing circuit to be in the audio range.

Figure 7:
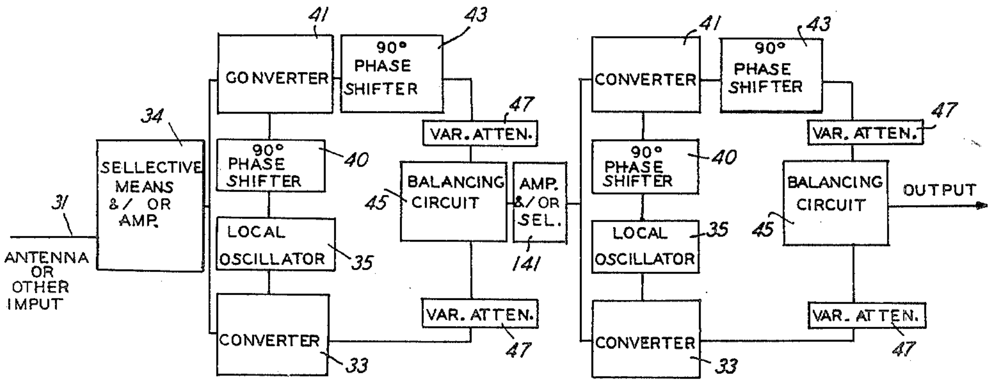
Fig. 7 is a block diagram of a third circuit embodying the concepts of the present invention.

Fig. 7 shows a circuit embodying the concepts of the present invention, the reference numerals employed being in most respects the same as those disclosed in Fig. 2 to indicate similar parts. An amplifier or selective means at 141 may be employed between the output of the balancing circuit 45 for the left-hand part of the circuit shown and the input of the right-hand part of the circuit shown.

By comparing Fig. 7 and Fig. 5, it is evident that one possible use of the circuit disclosed in Fig. 7 is to receive an input from an antenna and provide an audio output. That is, the output from the left-hand part of the circuit disclosed in Fig. 7 could be in a frequency range between audio frequency and the incoming radio-frequency, and the right-hand part of the circuit disclosed in Fig. 7 could take such an output and convert it down to the audio range.

However, another, and it is believed more important, use of the circuit in Fig. 7 is to select a particular band in the frequency spectrum and sharply isolate this band from the remaining frequencies in the frequency spectrum in a manner not possible with tuned circuits, filters and the like.

Figure 8:
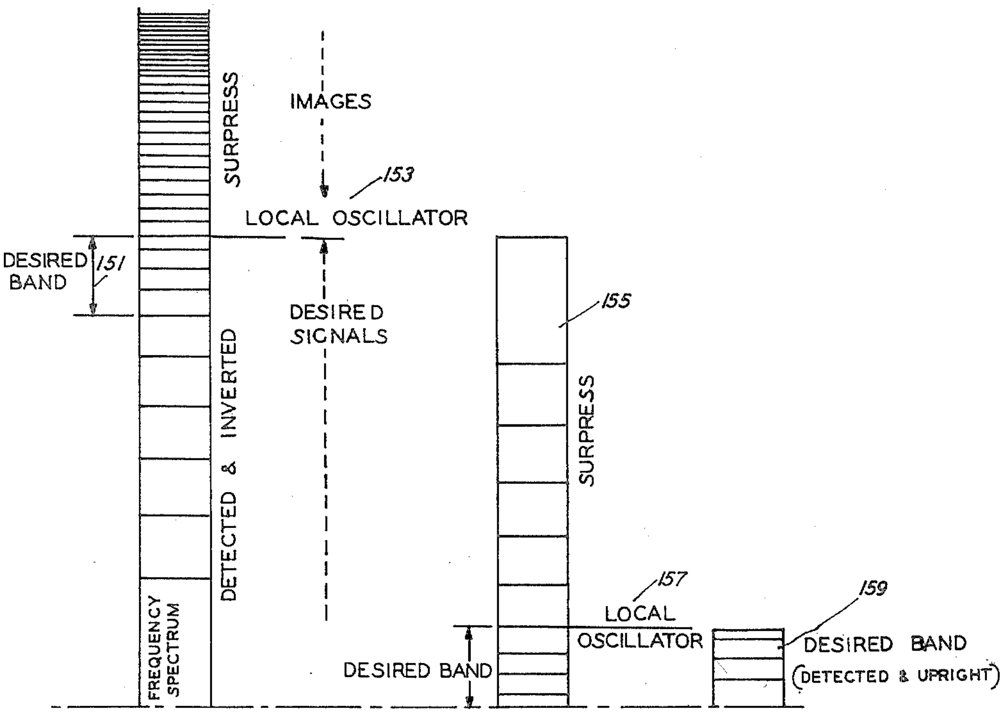
Fig. 8 is a diagram which is helpful in understanding the operation of the circuit disclosed in Fig. 7.

Fig. 8 best illustrates the operation of the circuit disclosed in Fig. 7. It may be assumed that the desired band of frequencies which it is desired to isolate and study or utilize is located in the range indicated at 151. The local oscillator frequency of the local oscillator 35 is then made to have a value just above the band 151 as indicated at 153. By following the explanation previously given in connection with the other circuits, it is apparent that, by the suitable correlation of phase shifting means and balancing circuitry, the frequencies above the local oscillator frequency at 153 can be suppressed whereas the frequencies below the local oscillator frequency 153 will be detected and inverted as indicated at 155. Frequencies 155 therefore represent the output from the left-hand part of the circuit disclosed in Fig. 7.

The frequency of the local oscillator 35 for the right-hand part of the circuit disclosed in Fig. 7 is made to have a value at 157, as shown in Fig. 8, and, by a suitable correlation of phase shifting means and balancing circuitry, the frequencies above the local oscillator frequency at 157 can be suppressed and the frequencies below the local oscillator frequency 157 can be detected and inverted. The output of the circuit disclosed in Fig. 7 is, therefore, indicated at 159, which is the desired band brought down to the audio range and in an upright position because of the two inverting steps caused by the local oscillators 35.

By a careful adjustment of the variable attenuators at 47, the suppression of the images in the balancing circuit at 45 can be made to be very severe so that an extremely sharp selectivity is obtained. It will be appreciated that the sharp selectivity obtained is much greater than that obtainable with selective networks and is dependent only upon the accuracy of the phase and magnitude balancing throughout the band desired. What is done with the output of the circuit in Fig. 7 is a matter of choice. If the circuit is utilized as a receiver, the output can be fed to a speaker. If the circuit is employed as a frequency spectrum analyzer, the output will be handled differently. Conceivably, the output of the circuit disclosed in Fig. 7 could be amplified and beat with the output from a local oscillator to elevate the same in the frequency spectrum for study. Other uses of the circuit will occur to those skilled in the art.

By adjusting the frequency of the local oscillator in the left-hand part of the circuit disclosed in Fig. 7, the place in the frequency spectrum at which a band is to be removed is varied, and by adjusting the frequency of the local oscillator 35 in the right-hand part of the circuit the width of the band removed is varied. It is thus apparent that the local oscillators 35 in Fig. 7 may be adjustable oscillators or may be fixed, depending on the particular form of circuit desired.

In connection with all the circuits embodying the concepts of the present invention, it is pointed out that, instead of phase shifting a particular signal or set of signals 90° in one direction, the signal could as well be shifted in the opposite direction 270° to obtain a signal or set of signals of the identical phase relation obtained by the 90° phase shift.

It is further pointed out that image cancellation can be obtained by utilizing a phase shifter between a local oscillator and the associated converter which functions to shift the phase of the local oscillator frequency by an amount other than 90°. For instance, a 45° phase shifter may be employed, this shifter functioning to spread the image and wanted signal frequencies by only 90° instead of 180°, as in the various circuits disclosed. Thereafter, one or the other of the branches of the circuit could be phase shifted 135° in a direction to place the image frequencies in the two branches of a circuit in cancellable phase relative to one another but to place the wanted signal frequencies in noncancellable phase. This noncancellable phase in the illustration above would be one where the two sets of wanted signal frequencies would have a 90° phase relation to thus produce a vector greater than either of such sets but, of course, less than the maximum obtainable were the two sets of wanted signals directly additive. From the above illustration it is apparent that various other degrees of phase shift could be employed to obtain a cancellation of the image frequencies without cancelling the wanted signal frequencies. In fact, the invention is intended to cover all such circuits where there is a preliminary phase shifting operation and then a subsequent phase shifting operation which combines to place the two sets of image frequencies in cancellable phase but to place the wanted signal frequencies in noncancellable phase. By "noncancellable phase" is meant any phase relation where the signals are not entirely cancelled, assuming they are of the same magnitude.

The preliminary phase shifting operation may be considered in the nature of a phase spreading operation, and the subsequent phase shifting operation may be considered as one of phase rotation. That is, the preliminary phase shifting operation functions to so spread the phases of the image and wanted signal voltages that when the subsequent relative phase rotating operation takes place the image voltages are placed in cancellable phase in the balancing circuit. Although the phase spreading operation takes place before the phase rotating operation in the circuits of the present invention, the invention is not intended to be limited to this order of operation. It is the combination of a phase spreading and phase rotating operation embodied in the particular circuits disclosed herein that is important.

It is further pointed out that the present invention is not intended to be limited to circuits having only two branches, since the objects of the present invention may be carried out in a circuit having three or more branches. For instance, a circuit having three branches could be arranged to provide three sets of image frequencies, each phase shifted 135° from the others, and with the wanted signal frequencies being phase shifted in a manner such that they were not entirely cancelled. Thus, the image frequencies would cancel one another, leaving an output of the wanted signal or signals.

It will be apparent to those skilled in the art, that although certain of the circuits in the present invention carry out a cancellable phase shift on the image frequencies in two steps, such a phase shift may be carried out in more than two steps. However, carrying out such a phase shifting operation in more than two steps will normally require more components and thus will not be as advantageous as the manner specifically disclosed in the present application.

Those skilled in the art will also appreciate that, instead of the first phase shifter in the circuits of the present invention being arranged between the local oscillator and one of the converters, such phase shifter could be arranged ahead of said one converter to achieve the same result. Still further, if such a relocated phase shifting means is specially contrived, it may be possible to carry out the entire relative phase shifting operations in the converters without requiring the use of a second phase shifter.

Having described the invention in what are considered to be the preferred embodiments thereof, it is desired that it be understood that the invention is not to be limited by the specific details shown unless they constitute critical features of the present invention, all of which will be apparent by reference to the following claims.

I claim:

1. A modulating circuit including first and second parallel circuits, said first circuit operable to receive frequencies above a predetermined frequency and reject the frequencies below such frequency, said second circuit being operable to reject frequencies above a lower predetermined frequency thus to select a desired band of frequencies, each circuit having an input end and an output end, the output end of the first circuit being connected to the input end of the second circuit, a converter in each branch of each parallel circuit, a local oscillator for each circuit, each local oscillator being connected to the converters of its circuit, the oscillator for the first parallel circuit having a higher frequency output than the oscillator of the second parallel circuit, a phase shifter for each oscillator arranged between the associated oscillator and one of the associated converters, a balancing means for each circuit, each balancing means being connected to the outputs of the associated converters, and a phase shifter for each circuit, each phase shifter being interposed between the associated balancing means and one of the associated converters.

2. A modulating circuit including first and second parallel circuits, said first circuit operable to receive the frequencies above a predetermined frequency and reject the frequencies below such frequency, said second circuit being operable to reject frequencies above a lower predetermined frequency thus to select a desired band of frequencies, each parallel circuit having an input end and an output end, the output end of the first parallel circuit being connected to the input end of the second circuit, a converter in each branch of each parallel circuit, local oscillator means for each circuit, the local oscillator means for the first parallel circuit having a higher frequency output than the local oscillator means for the second parallel circuit, each local oscillator means being operative to supply to the associated converters energies of different relative phases, balancing means for each circuit, each balancing means being connected to the outputs of the associated converters, and a phase shifter for each circuit, each phase shifter being interposed between the associated balancing means and at least one of the associated converters.

3. A circuit for receiving energies of a wide frequency spectrum and operative for selecting a desired band therefrom and detecting the same, comprising means for generating first local energies of a frequency on the high side of the desired band, and of different relative phases, means for beating the received energies against local energies of different relative phases so as to produce beat frequency energies of different phases, means for effecting a relative phase shift between beat frequency energies of one phase relative to beat frequency energies of a different phase to place these energies in cancellable phase relation, and means for balancing these beat frequency energies against one another to balance out the beat frequency energies representing the frequencies above that locally generated and to leave beat frequency energies representing the desired band and frequencies below that of the locally generated energies, means for generating second local energies of a lower frequency from that of the first locally generated energies, means for beating the uncancelled first beat frequency energies against second localy generated energies of different phases so as to provide second beat frequency energies of different phases, means for effecting a relative phase shift between second beat frequency energies of one phase relative to second beat frequency energies of another phase to place them in cancellable phase, and means for balancing these second beat frequency energies against one another to balance out energies above the frequency of that of the second generated local energies and leave only second beat frequency energies representing the desired band.

4. A circuit for receiving energies of a wide frequency spectrum and operative for selecting a desired band therefrom, comprising means for generating first local energies of a frequency on one side of the desired band and of different relative phases, means for beating the received energies against local energies of different relative phases so as to produce beat frequency energies of different phases, means for effecting a relative phase shift between beat frequency energies of one phase relative to beat frequency energies of a different phase to place these energies in cancellable phase relation, and means for balancing these beat frequency energies against one another to balance out the beat frequency energies representing the frequencies on one side of that locally generated and to leave beat frequency energies representing the desired band and frequencies on the other side of that of the locally generated energies, means for generating second local energies of a lower frequency from that of the first locally generated energies, means for beating the uncancelled first beat frequency energies against second locally generated energies of different phases so as to provide second beat frequency energies of different phases, means for effecting a relative phase shift between second beat frequency energies of one phase relative to second beat frequency energies of another phase to place them in cancellable phase, and means for balancing these second beat frequency energies against one another to balance out energies above the frequency of that of the second generated local energies and leave only second beat frequency energies representing the desired band.

References Cited in the file of this patent

UNITED STATES PATENTS

| | | |
|---|---|---|
| 2,044,745 | Hansell | June 16, 1936 |
| 2,522,369 | Guanella | Sept. 12, 1950 |